Jan. 20, 1942.                A. WARMISHAM                    2,270,235
                              OPTICAL OBJECTIVE
                             Filed Dec. 14, 1939

Inventor
A. WARMISHAM
by Blair & Kilcoyne
Attorney

Patented Jan. 20, 1942

2,270,235

UNITED STATES PATENT OFFICE 2,270,235

OPTICAL OBJECTIVE

Arthur Warmisham, Leicester, England, assignor to Taylor, Taylor & Hobson Limited, Leicester, England, a company of Great Britain Application December 14, 1939, Serial No. 309,268
In Great Britain December 29, 1938

12 Claims. (Cl. 88—57)

This invention relates to an optical objective for photographic or projection or like purposes consisting of a lens system corrected for spherical aberration, coma, astigmatism and distortion, of the kind comprising a double-concave asymmetrical divergent component disposed behind two convergent components and in front of a third convergent component and having its shallow side turned towards the front two components, each of the four components being in the form of a simple element, i. e. consisting of a single piece of glass. It should be made clear that the side of the longer conjugate is herein regarded as the "front" of the objective in accordance with the normal convention.

The present invention has for its primary object to provide an objective of the above kind in which a considerably higher degree of correction than hitherto can be obtained for the same aperture or alternatively a similar degree of correction for a larger aperture.

Figure 1:
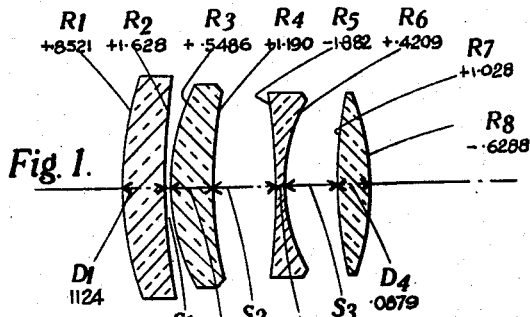
Figure 2:
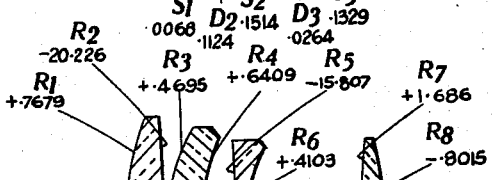
Figure 3:
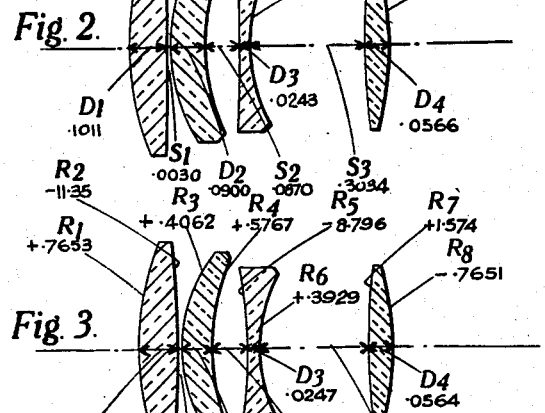
Figure 4:
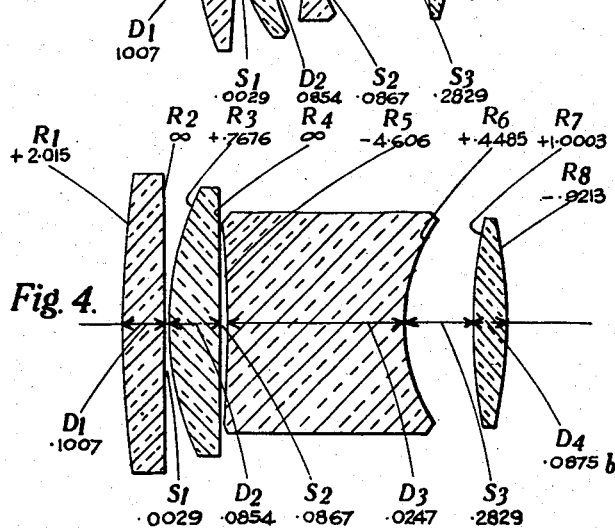

More detailed objects of the invention will be apparent from the appended claims and from the following description of the accompanying drawing, in which Figure 1 is an axial section of one example of objective according to the invention, and Figures 2 to 4 are similar views of three further examples.

Numerical data for these four examples are given in the following tables, in which the radii of curvature of the individual surfaces are designated by $R_1$ $R_2$ ... counting from the front, the positive sign indicating that the surface is convex towards the front and the negative sign that it is concave thereto, whilst the thicknesses of the individual elements along the axis are designated by $D_1$ $D_2$ ..., and the axial air spaces between the various components by $S_1$ $S_2$ $S_3$. The tables also give the mean refractive indices and the Abbé V numbers of the glasses used for the individual elements.

Example I

Equivalent focal length 1,000. Relative aperture F/1.8

| Radius | Thickness or separation | Refractive index $n_D$ | Abbé V number |
|---|---|---|---|
| $R_1=+$ .8521 |  |  |  |
| $R_2=+1.628$ | $D_1=$ .1124 | 1.850 | 42.0 |
|  | $S_1=$ .0068 |  |  |
| $R_3=+$ .5486 |  |  |  |
| $R_4=+1.190$ | $D_2=$ .1124 | 1.850 | 42.0 |
|  | $S_2=$ .1514 |  |  |
| $R_5=-1.882$ |  |  |  |
| $R_6=+$ .4209 | $D_3=$ .0264 | 2.022 | 19.1 |
|  | $S_3=$ .1329 |  |  |
| $R_7=+1.028$ |  |  |  |
| $R_8=-$ .6288 | $D_4=$ .0879 | 1.848 | 32.5 |

Example II

Equivalent focal length 1.000. Relative aperture f/2.0

| Radius | Thickness or separation | Refractive index $n_D$ | Abbé V number |
|---|---|---|---|
| $R_1=+$ .7679 |  |  |  |
| $R_2=-20.226$ | $D_1=$ .1011 | 1.800 | 38.4 |
|  | $S_1=$ .0030 |  |  |
| $R_3=+$ .4695 |  |  |  |
| $R_4=+$ .6409 | $D_2=$ .0900 | 1.800 | 38.4 |
|  | $S_2=$ .0870 |  |  |
| $R_5=-15.807$ |  |  |  |
| $R_6=+$ .4103 | $D_3=$ .0243 | 2.022 | 19.1 |
|  | $S_3=$ .3034 |  |  |
| $R_7=+1.686$ |  |  |  |
| $R_8=-$ .8015 | $D_4=$ .0566 | 1.842 | 35.5 |

Example III

Equivalent focal length 1.000. Relative aperture f/2.0

| Radius | Thickness or separation | Refractive index $n_D$ | Abbé V number |
|---|---|---|---|
| $R_1=+$ .7653 |  |  |  |
| $R_2=-11.35$ | $D_1=$ .1007 | 1.800 | 38.4 |
|  | $S_1=$ .0029 |  |  |
| $R_3=+$ .4062 |  |  |  |
| $R_4=+$ .5767 | $D_2=$ .0854 | 1.613 | 37.3 |
|  | $S_2=$ .0867 |  |  |
| $R_5=-8.796$ |  |  |  |
| $R_6=+$ .3929 | $D_3=$ .0247 | 2.022 | 19.1 |
|  | $S_3=$ .2829 |  |  |
| $R_7=+1.574$ |  |  |  |
| $R_8=-$ .7651 | $D_4=$ .0564 | 1.842 | 35.5 |

Example IV

Equivalent focal length 1.000. Relative aperture f/1.3

| Radius | Thickness or separation | Refractive index $n_D$ | Abbé V number |
|---|---|---|---|
| $R_1=+2.015$ |  |  |  |
| $R_2=\infty$ | $D_1=$ .1160 | 1.893 | 30.8 |
|  | $S_1=$ .0018 |  |  |
| $R_3=+$ .7676 |  |  |  |
| $R_4=\infty$ | $D_2=$ .1382 | 1.848 | 32.5 |
|  | $S_2=$ .0084 |  |  |
| $R_5=-4.606$ |  |  |  |
| $R_6=+$ .4485 | $D_3=$ .4799 | 2.022 | 19.1 |
|  | $S_3=$ .1704 |  |  |
| $R_7=+1.0003$ |  |  |  |
| $R_8=-$ .9213 | $D_4=$ .0875 | 1.850 | 42.0 |

It will be noticed that in all four examples the mean refractive indices of the glasses used for at least two of the three simple convergent components are greater than 1.75 whilst that of the glass used for the divergent component is greater than 1.8. Various examples of glass having such high refractive index are given in British patent specification No. 462,304, such glass having as its main constituents oxides of elements such as tungsten, tantalum, lanthanum, thorium, yttrium, zirconium, hafnium and columbium.

In all four examples also, the numerical value of the radius $R_5$ of the front surface of the divergent component is greater than the radius $R_8$ of the rear surface of the rear component, both such surfaces being concave towards the front. The radius $R_8$ is also less than 1.75 times the equivalent focal length of the whole objective.

Another important feature of the invention present in the first three examples is that the sum of the numerical values of the radii $R_1$ and $R_8$ of the front surface of the front component and the rear surface of the rear component is greater than 1.25 and less than 2.5 times the equivalent focal length of the whole objective.

Important features in Example IV are that the radius $R_5$ of the shallow side of the divergent component is at least ten times the radius $R_6$ of the other side thereof, the glass used for the rear component having a mean refractive index greater than 1.8 and an Abbe' V number less than 42, whilst the mean refractive index of the glass used for the divergent component is greater than 1.9.

What I claim as my invention and desire to secure by Letters Patent is:

1. An optical objective corrected for spherical aberration, coma, astigmatism and distortion and comprising four axially aligned lens components separated by air gaps and each consisting of a simple element, the two front components and the rear component being convergent components, whilst the third is a double-concave asymmetrical divergent component having its shallow side turned towards the front, the mean refractive indices of the glasses used for at least two of the three convergent components being greater than 1.75 and less than 1.93 whilst that of the glass used for the divergent component is greater than 1.8 and less than 2.05.

2. An objective as claimed in claim 1, in which the sum of the numerical values of the radii of the front surface of the front component and the rear surface of the rear component is greater than 1.25 and less than 2.5 times the equivalent focal length of the whole objective.

3. An objective as claimed in claim 1, in which the numerical value of the radius of the front surface of the divergent component is greater than that of the rear surface of the rear convergent component, both such surfaces being concave towards the front.

4. An objective as claimed in claim 1, in which the radius of the rear surface of the rear component is less than 1.75 times the equivalent focal length of the whole objective.

5. An optical objective as claimed in claim 1, in which the numerical value of the radius of the rear surface of the rear convergent component is less than that of the front surface of the divergent component and is also less than 1.75 times the equivalent focal length of the objective, both such surfaces being concave towards the front.

6. An objective as claimed in claim 1, in which the sum of the numerical values of the radii of the front surface of the front component and the rear surface of the rear component is greater than 1.25 and less than 2.5 times the equivalent focal length of the whole objective and in which the numerical value of the rear surface of the rear convergent component is less than that of the front surface of the divergent component and is also less than 1.75 times the equivalent focal length of the objective, the said rear surface being concave towards the front.

7. An optical objective corrected for spherical aberration, coma, astigmatism and distortion and comprising four axially aligned lens components separated by air gaps and each consisting of a simple element, the two front components and the rear component being convergent components, whilst the third is a double concave asymmetrical divergent component having its shallow side turned towards the front, such shallow side having a radius at least ten times that of the other side of the divergent component, the glass used for the divergent component having a mean refractive index greater than 1.9 and less than 2.05, whilst the glass used for the rear component has a mean refractive index greater than 1.8 and less than 1.93 and an Abbé V number not greater than 4.2.

8. An optical objective as claimed in claim 7, in which the mean refractive indices of the glasses used for the front two convergent components are greater than 1.75.

9. An optical objective as claimed in claim 7, in which the mean refractive indices of the glasses used for the front two convergent components are greater than 1.8.

10. An optical objective having numerical data substantially as set forth in the following table:

Equivalent focal length 1.000. Relative aperture F/1.8

| Radius | Thickness or separation | Refractive index $n_D$ | Abbé V number |
|---|---|---|---|
| $R_1 = +.8521$ | $D_1 = .1124$ | 1.850 | 42.0 |
| $R_2 = +1.628$ | $S_1 = .0068$ | | |
| $R_3 = +.5486$ | $D_2 = .1124$ | 1.850 | 42.0 |
| $R_4 = +1.190$ | $S_2 = .1514$ | | |
| $R_5 = -1.882$ | $D_3 = .0264$ | 2.022 | 19.1 |
| $R_6 = +.4209$ | $S_3 = .1329$ | | |
| $R_7 = +1.028$ | $D_4 = .0879$ | 1.848 | 32.5 |
| $R_8 = -.6288$ | | | | wherein $R_1 R_2 \ldots$ are the radii of curvature of the individual surfaces counting from the front, $D_1 D_2 \ldots$ the axial thicknesses of the individual elements, and $S_1 S_2 S_3$ the axial air spaces between the various components.

11. An optical objective having numerical data substantially as set forth in the following table:

Equivalent focal length 1.000. Relative aperture F/2.0

| Radius | Thickness or separation | Refractive index $n_D$ | Abbé V number |
|---|---|---|---|
| $R_1 = +\ .7679$ | | | |
| | $D_1 = .1011$ | 1.800 | 38.4 |
| $R_2 = -20.226$ | | | |
| | $S_1 = .0030$ | | |
| $R_3 = +\ .4695$ | | | |
| | $D_2 = .0900$ | 1.800 | 38.4 |
| $R_4 = +\ .6409$ | | | |
| | $S_2 = .0870$ | | |
| $R_5 = -15.807$ | | | |
| | $D_3 = .0243$ | 2.022 | 19.1 |
| $R_6 = +\ .4103$ | | | |
| | $S_3 = .3034$ | | |
| $R_7 = +\ 1.686$ | | | |
| | $D_4 = .0566$ | 1.842 | 35.5 |
| $R_8 = -\ .8015$ | | | | wherein $R_1$ $R_2$ ... are the radii of curvature of the individual surfaces counting from the front, $D_1$ $D_2$ ... the axial thicknesses of the individual elements, and $S_1$ $S_2$ $S_3$ the axial air spaces between the various components.

12. An optical objective having numerical data substantially as set forth in the following table:

Equivalent focal length 1.000. Relative aperture F/1.3

| Radius | Thickness or separation | Refractive index $n_D$ | Abbé V number |
|---|---|---|---|
| $R_1 = +\ 2.015$ | | | |
| | $D_1 = .1160$ | 1.893 | 30.8 |
| $R_2 = \infty$ | | | |
| | $S_1 = .0018$ | | |
| $R_3 = +\ .7676$ | | | |
| | $D_2 = .1382$ | 1.848 | 32.5 |
| $R_4 = \infty$ | | | |
| | $S_2 = .0084$ | | |
| $R_5 = -4.606$ | | | |
| | $D_3 = .4799$ | 2.022 | 19.1 |
| $R_6 = +\ .4485$ | | | |
| | $S_3 = .1704$ | | |
| $R_7 = +1.0003$ | | | |
| | $D_4 = .0875$ | 1.850 | 42.0 |
| $R_8 = -\ .9213$ | | | | wherein $R_1$ $R_2$ ... are the radii of curvature of the individual surfaces counting from the front, $D_1$ $D_2$ ... the axial thicknesses of the individual elements, and $S_1$ $S_2$ $S_3$ the axial air spaces between the various components.

ARTHUR WARMISHAM.